United States Patent

[11] 3,590,711

| [72] | Inventors | Vincenzo Milanese;<br>Angelo Bianchi, both of Ceva Cuneo, Italy |
|---|---|---|
| [21] | Appl. No. | 735,314 |
| [22] | Filed | June 7, 1968 |
| [45] | Patented | July 6, 1971 |
| [73] | Assignee | Ferrania S.p.A. Corso Matteotti<br>Milan, Italy |
| [32] | Priority | June 10, 1967 |
| [33] | | Italy |
| [31] | | 37,398 |

[54] FILM ADVANCEMENT CONTROL APPARATUS FOR CAMERAS
6 Claims, 5 Drawing Figs.

[52] U.S. Cl. .................................. 95/31, 242/71.3
[51] Int. Cl. ............................... G03b 1/62, G03b 1/66
[50] Field of Search ............................ 95/31; 242/71

[56] References Cited
UNITED STATES PATENTS

| 2,796,813 | 6/1957 | Michaelis | 95/31 X |
| 2,364,381 | 12/1944 | Mihalyi | 242/71 |
| 2,621,866 | 12/1952 | Harvey | 95/31 (UX) |
| 3,066,884 | 12/1962 | Rehn | 242/71 |
| 3,148,605 | 9/1964 | Peterson | 95/31 |
| 3,232,196 | 2/1966 | Sapp | 95/31 |

FOREIGN PATENTS

| 1,113,932 | 5/1968 | England | 95/31 |

*Primary Examiner* — Samuel S. Matthews
*Assistant Examiner* — Russell E. Adams, Jr.
*Attorney* — Kinney, Alexander, Sell, Steldt & De La Hunt ABSTRACT: An apparatus for controlling film advancement in inexpensive cameras is shown which comprises a takeup roll which cooperates with an exposure count scale to indicate the number of frames which have been advanced through the camera, and a film-metering device having a spiral track with detent seats therein and means for registering with the detent seats to interrupt travel of film through the camera at one-frame intervals.

PATENTED JUL 6 1971 3,590,711
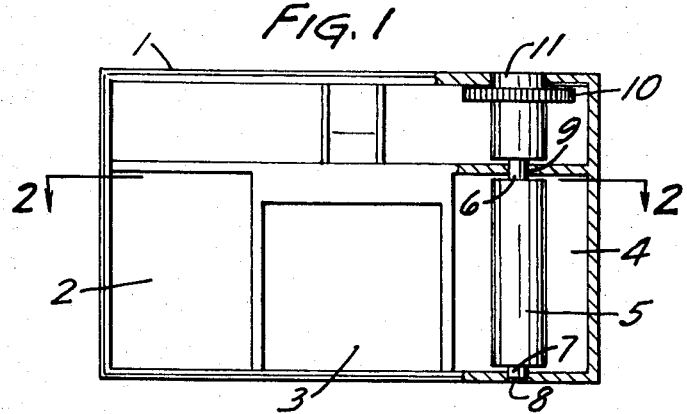
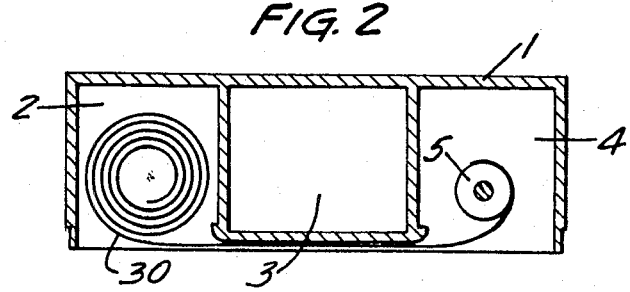
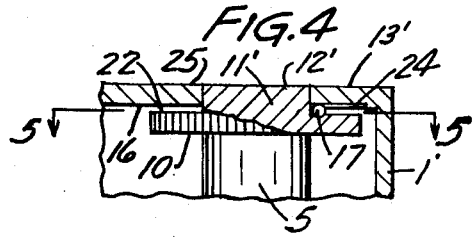
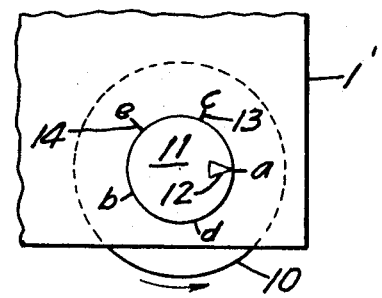
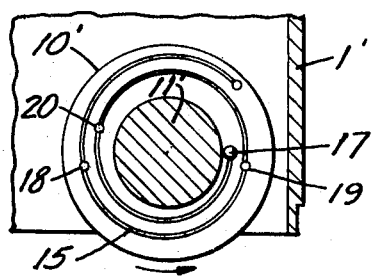
INVENTORS
VINCENZO MILANESE
ANGELO BIANCHI
BY Kinney, Alexander,
Sell, Steldt & DeLaHunt
ATTORNEYS

FILM ADVANCEMENT CONTROL APPARATUS FOR CAMERAS

This invention provides a simple, inexpensive apparatus for controlling the advancement of film through a camera.

Film is metered through amateur "film-cartridge" cameras by means of a film-metering device which registers with perforation in the film. For example, a camera may contain a film-sensing finger which is biased against the film in line with the path traveled by film perforations as the film is drawn through the camera. Upon encountering a perforation in the film, the film-sensing finger enters the perforation and stops further movement of the film. Activation of the camera shutter causes withdrawal of the finger from the film perforation and permits the film to be advanced one additional frame. The frame ready for exposure is indicated to the operator by a number or, a separate film backing which is viewed through an opening in the camera case. This improved apparatus is especially useful for an inexpensive camera which has an integral case that is not to be opened by the camera user; when the camera user has exposed all the film in the camera, he returns it to the film processor.

The improved apparatus of this invention includes a simple frame counting device which obviates the use of numbers on a separate film backing and accordingly permits use of film which contains no film backing. In a preferred embodiment, the improved apparatus of this invention also includes a simple and inexpensive film-metering device that does not require perforated film.

Briefly, the apparatus of the present invention comprises a takeup roll which is rotatably mounted within a camera. An integral part of the takeup roll bears a reference mark which is visible from outside the camera and which cooperates with an exposure count scale on the outer surface of the camera casing to indicate the number of frames which remain to be exposed. The takeup roll is connected to a takeup knob which is capable of being operated from outside the camera. The apparatus contains a film-metering device which comprises a first member having a spiral track containing detent seats, and a second member positioned in opposed, spaced relation to the first member. The second member has retaining means thereon positioned to cross the spiral tack of the first member. One of the members is rotatably mounted within the camera casing and operatively coupled to the takeup roll. The other member is positioned in fixed relation to the camera casing. A ball is positioned between the first and second members and engages the spiral track and the retaining means. The ball is capable of following the spiral track to sequentially releasably engage the detent seats as one of the members is rotated relative to the other of the members rotation of the takeup knob.

The present invention may be described by reference to the accompanying drawing wherein:

FIG. 1 is a rear view in partial cross section of the inside of a camera provided with a device of the present invention;

FIG. 2 is a cross-sectional view taken along line 2—2 of FIG. 1;

FIG. 3 is an enlarged broken-away detailed view of an indicator device of the present invention;

FIG. 4 is an enlarged side view of a preferred film-metering and frame-counting device of the present invention shown broken away and in partial cross section; and FIG. 5 is a cross-sectional view taken along line 5—5 of FIG. 4.

Referring now to FIGS. 1 and 2, a camera casing 1 is provided with a first chamber 2 for storage of the film 30 to be exposed, an exposing chamber 3 in which film is photographically exposed and which is adjacent the first chamber 2, and a third chamber 4 positioned adjacent the exposing chamber 3 and adapted to receive exposed film on a takeup roll 5. The camera illustrated in FIG. 1 is intended to be used with perforated film and uses a film-metering device (not illustrated) of the previously described type in which a film-sensing finger is biased against the film 30 so that when the finger encounters a film perforation, film travel is halted.

The takeup roll 5 is rotatably mounted in the chamber 4 by reduced-diameter extensions 6 and 7 of the takeup roll which are journaled in recesses 8 and 9 in the camera case and in an inner camera wall respectively. In the camera illustrated, the takeup roll 5 is formed integrally with an extension 11 thereon and a takeup knob 10 which may be turned from outside the camera. The knob 10 can be operatively connected to the takeup roll 5 in other ways, for example, by gear means. The extension 11 of takeup roll 5 bears a reference mark 12 which is visible from outside the camera and which cooperates with an exposure count scale 13 on camera casing 1 to indicate the number of frames that have been advanced through the camera. The marks "a," "b," etc. of the scale 13 are located so as be coordinated with perforations in the film. When film is attached to the takeup roll 5 and is then advanced to place the first frame to be exposed in the exposing chamber 3 by rotation of the takeup roll 5, the film-sensing finger of the film-metering device will register with the first perforation when the reference mark 12 on the extension 11 is in line with mark "a" on the scale 13. When the takeup knob 10 has been turned to advance the next frame of film into the exposing chamber 3, the film-sensing finger of the film-metering device will register with the next perforation in the film when the reference mark 12 is in line with mark "b" on the scale 13. In some cameras of this invention the takeup roll 5 may require rotation through an angle of more than 360° to advance a single frame of film.

FIGS. 4 and 5 illustrates a preferred embodiment of the present invention. This embodiment is useful with imperforate photographic film and includes a film-metering device different from the film-metering device of the camera illustrated in FIGS. 1—3. A spiral groove 15 is formed on surface 22 of a takeup knob 10' that is otherwise similar to the knob 10 in the camera of FIGS. 1—3. The surface 22 of the knob 10' is closely spaced from the inner surface 16 of the camera casing 1', and the inner surface 16 is formed with a transverse groove 24 that angles across the spiral recess 15 in the knob 10'. A ball 17 is retained between the inner surface 16 of the camera case and surface 22 of the takeup knob 5, and extends into both the spiral groove 15 and the transverse groove 24. Instead of recessing the groove 15 in the knob, any means can be used to form a spiral track thereon in which the ball 17 may travel, such as parallel ridges above the surface 22. In addition, instead of the transverse groove 24, other retaining means, such as a ledge transverse to the spiral track may be used.

The spiral groove 15 contains a series of depressions 18, 19, 20, etc. along its length that form detent seats in which the ball 17 may come to rest. The ball 17 is under pressure between the knob 10' and the casing 1' both when the ball 17 is at rest in a detent seat and when it follows the spiral groove 15 as the takeup knob 10' is rotated. An operator may rotate the knob 10' quite freely when the ball 17 is not in one of of the detent seats. When the ball 17 registers in one of the detent seats, however, rotation of the knob 10' is much more difficult.

As the takeup knob 10' is rotated, the ball 17 follows the spiral groove 15. With reference to the camera casing 1', the ball 17 moves in a straight or curved path depending on whether the transverse groove is straight or curved over its length. As illustrated in FIGS. 4 and 5, when the takeup knob 10' is rotated, the ball 17 travels toward the outer periphery of takeup knob 10'. The direction of the spiral groove 15, of course may be reversed, in which case the ball 17 would move towards the center of takeup knob 10'. The detent seats 18, 19 20, etc. are spaced along the spiral groove 15 so as to sequentially engage the ball 17 as the film is advanced at one-frame intervals through the exposure chamber 3, each detent seat corresponding to the advancement of a single frame of film.

The camera illustrated in FIGS. 4 and 5 includes a cylindrical boss 11', a reference mark 12' on the boss 11' and an exposure count scale 13' on the 10'. camera casing. The marks of the scale 13' are coordinated with the detent seats 18, 19, 20, etc. to indicate the number of frames that have been advanced through the camera. Alternatively, the portion 25 of camera casing 1' adjacent the takeup knob 10' may be transparent, permitting an operator to determine the number of exposures remaining by viewing which detent seat is engaged by the ball 17. A spiral track may be formed on the inner surface 16 of the camera casing 1', and a retaining means may be located on the surface 22 of the takeup knob 10'. Further, a ball such as ball 17 may be retained between other closely adjacent fixed and movable parts of the camera, for example, between the camera casing 1' and a wheel connected by gears to a takeup roll or to a turning knob.

The present invention has been described by reference to the preferred embodiments thereof. It is understood, however, that changes and modifications in the preferred embodiment can be made without departing from the spirit or scope of the present invention.

What we claim is:

1. Apparatus for controlling the advancement of film through a camera comprising a camera casing having on the outer surface thereof an exposure count scale including a series of spaced marks, a film-metering device positioned within said camera casing to interrupt the continuous travel of said film through said camera at one frame intervals, and a takeup roll rotatably mounted within said camera casing and having an externally operable takeup knob operatively coupled thereto, said takeup roll having an integral extension upon which is carried a reference mark which is visible from outside said camera and which cooperates with said exposure count scale as said takeup roll rotates to indicate the number of frames that have been advanced through the camera, said reference mark being coordinated with said exposure count scale and said film-metering device so that when film travel is interrupted, said reference mark is aligned with an appropriate mark of said exposure count scale.

2. The apparatus of claim 1 wherein said film-metering device comprises;
   a first member having a spiral track containing detent seats;
   a second member positioned in opposed, spaced relation to said first member and having retaining means thereon positioned to cross said spiral track of said first member, one of said members being rotatably mounted within said camera casing and operatively coupled to said takeup roll, and the other of said members being positioned in fixed relation to said camera casing; and
   a ball positioned between said first and second members and engaging said spiral track and said retaining means, said ball being capable of following said spiral track to sequentially releasably engage said detent seats as one of said members is rotated relative to the other of said members by rotation of said takeup knob to advance said film in one-frame intervals through said camera.

3. In a camera having a camera casing, a film takeup roll rotatably mounted within said casing, and a takeup knob operatively coupled to said takeup roll and operable from outside said camera; a film-metering device comprising;
   a first member having thereon a spiral track having detent seats therein;
   a second member positioned in opposed, spaced relation to said first member and having thereon retaining means positioned to cross said spiral track, one of said members being rotatably mounted and operatively coupled to said takeup roll, and the other of said members being positioned in fixed relation to said camera casing; and
   a ball positioned between said first member and said second member and engaging said spiral track and said retaining means, said ball being capable of following said spiral track to sequentially releasably engage said detent seats as one of said members is rotated relative to the other of said members by rotation of said takeup knob to advance said film in one-frame intervals through said camera.

4. The camera of claim 3 wherein said ball is retained between said camera casing and said takeup knob.

5. The camera of claim 3 wherein said camera casing has an outer surface bearing an exposure count scale, and wherein said takeup roll has an integral extension which bears a reference mark which is visible from outside said camera and which cooperates with said exposure count scale to indicate the number of frames that have been advanced through said camera.

6. The camera of claim 3 wherein said spiral track having detent seats therein is visible from outside said camera and wherein said detent seats in said spiral track are marked to indicate the number of frames that have been advanced through said camera.